(12) United States Patent
Yu et al.

(10) Patent No.: US 9,225,656 B2
(45) Date of Patent: Dec. 29, 2015

(54) QUALITY OF SERVICE IN A HETEROGENEOUS NETWORK

(75) Inventors: Shunjia Yu, San Jose, CA (US); Anoop Ghanwani, Rocklin, CA (US); John Michael Terry, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 256 days.

(21) Appl. No.: 13/096,725

(22) Filed: Apr. 28, 2011

(65) Prior Publication Data

US 2012/0201138 A1 Aug. 9, 2012

Related U.S. Application Data

(60) Provisional application No. 61/440,317, filed on Feb. 7, 2011.

(51) Int. Cl.
*H04W 4/00* (2009.01)
*H04L 12/857* (2013.01)
*H04L 12/801* (2013.01)

(52) U.S. Cl.
CPC ............ *H04L 47/2491* (2013.01); *H04L 47/10* (2013.01)

(58) Field of Classification Search
USPC ................... 370/235, 329, 395.5; 463/33, 34; 345/581, 629, 632; 711/158
See application file for complete search history.

(56) References Cited

U.S. PATENT DOCUMENTS

| | | | |
|---|---|---|---|
| 5,519,689 A | 5/1996 | Kim | |
| 5,748,612 A | 5/1998 | Stoevhase | |
| 5,828,653 A | 10/1998 | Goss | |
| 5,959,994 A | 9/1999 | Boggs | |
| 6,005,851 A | 12/1999 | Craddock | |
| 6,021,263 A | 2/2000 | Kujoory | |
| 6,094,435 A | 7/2000 | Hoffman | |
| 6,160,813 A | 12/2000 | Banks | |
| 6,205,149 B1 | 3/2001 | Lemaire | |
| 6,249,528 B1 * | 6/2001 | Kothary | 370/466 |
| 6,452,915 B1 | 9/2002 | Jorgensen | |
| 6,594,246 B1 | 7/2003 | Jorgensen | |
| 6,597,669 B1 | 7/2003 | Takahashi | |
| 6,598,034 B1 | 7/2003 | Kloth | |
| 6,611,522 B1 | 8/2003 | Zheng | |

(Continued)

FOREIGN PATENT DOCUMENTS

EP 1158724 A2 11/2001
WO WO0105099 1/2001

OTHER PUBLICATIONS

T10; "SCSI Architecture Model-3 (SAM-3)"; Sep. 21, 2004; cover to p. 114.

(Continued)

*Primary Examiner* — Phuongchau Ba Nguyen
(74) *Attorney, Agent, or Firm* — Blank Rome, LLP (57) ABSTRACT

A network device provides priority map storage configured to store one or more mapping data structures for mapping multiple priorities of a first priority scheme to multiple priorities of a second priority scheme. In addition, mapping logic of the network devices is coupled to the priority map storage and configured to translate a first priority of a first frame of the first priority scheme to a second priority of the second priority scheme and to assign the second priority to a second frame carrying payload of the first frame in preparation of transmission of the second frame in accordance with the second priority scheme.

17 Claims, 8 Drawing Sheets

(56) References Cited

U.S. PATENT DOCUMENTS

| | | |
|---|---|---|
| 6,636,509 B1 | 10/2003 | Hughes |
| 6,665,495 B1 | 12/2003 | Miles |
| 6,674,760 B1 | 1/2004 | Walrand |
| 6,760,309 B1 | 7/2004 | Rochberger |
| 6,901,052 B2 | 5/2005 | Buskirk |
| 6,940,814 B1* | 9/2005 | Hoffman .................. 370/235 |
| 6,957,258 B2 | 10/2005 | Maher |
| 6,963,578 B1 | 11/2005 | Akahane |
| 6,967,954 B2 | 11/2005 | Sugiyama |
| 7,046,665 B1 | 5/2006 | Walrand |
| 7,062,642 B1 | 6/2006 | Langrind |
| 7,068,645 B1 | 6/2006 | Phadnis |
| 7,139,270 B1* | 11/2006 | Fatehi et al. .................. 370/392 |
| 7,139,275 B1 | 11/2006 | Vyas |
| 7,251,218 B2 | 7/2007 | Jorgensen |
| 7,385,982 B2 | 6/2008 | Warden |
| 7,644,205 B1* | 1/2010 | Overby et al. .................. 710/40 |
| 7,656,898 B2 | 2/2010 | Ko |
| 7,813,365 B2 | 10/2010 | Brewer |
| 7,916,647 B2 | 3/2011 | Kanda et al. |
| 7,974,208 B2 | 7/2011 | Brewer |
| 8,032,697 B2* | 10/2011 | Kazar et al. .................. 711/112 |
| 2001/0053150 A1 | 12/2001 | Clear |
| 2002/0085536 A1 | 7/2002 | Rudrapatna |
| 2003/0026211 A1 | 2/2003 | Xu |
| 2006/0080451 A1* | 4/2006 | Eckert .................. 709/230 |
| 2006/0198301 A1* | 9/2006 | Airy et al. .................. 370/229 |
| 2008/0112420 A1* | 5/2008 | Wang et al. .................. 370/401 |
| 2008/0137568 A1* | 6/2008 | Ho et al. .................. 370/310 |
| 2008/0144632 A1* | 6/2008 | Rabie et al. .................. 370/395.5 |
| 2009/0168701 A1* | 7/2009 | White et al. .................. 370/328 |
| 2009/0316628 A1* | 12/2009 | Enns et al. .................. 370/328 |
| 2010/0082895 A1* | 4/2010 | Branscome et al. .......... 711/108 |
| 2011/0160880 A1* | 6/2011 | Gutha et al. .................. 700/87 |

OTHER PUBLICATIONS

Anita Karve; "Lesson 119: IP quality of service"; Network Magazine; Jun. 1998; pp. 27-28.

Jens Schmitt, Martin Karsten, and Ralf Steinmetz; "Design and Implementation of a Flexible, QoS-Aware IP/ATM Adaptation Module"; Proceedings of the IEEE Conference on High Performance Switching and Routing ATM 2000; Jun. 26, 2000; pp. 267-274.

Van Jacobson, Kathleen Nichols, Kedar Poduri; "The 'VirtualWire' Behavior Aggregate <draft-ietf-diffserv-ba-vw-00.txt>"; Internet Engineering Task Force, Differentiated Services Working Group; Mar. 2000; pp. 1-21.

Chunhung Richard Lin, Jain-Shing Liu; "QoS Routing in Ad Hoc Wireless Networks"; IEEE Journal on Selected Areas in Communications, vol. 17, No. 8; Aug. 1999; pp. 1426-1438.

Y. Bernet, R. Yavatkar, P. Ford, F. Baker, L. Zhang; "A Framework for End-to-End QoS Combining RSVP/Intserv and Differentiated Services"; Internet Engineering Task Force, draft-bernet-intdiff-00.txt; Mar. 1998; pp. 1-15.

"Fabric OS Version 2.0"; Brocade Communications Systems, Inc.; 1999; pp. cover to Index-4.

"Chapter 11 IronClad Quality of Service (QoS)"; Foundry Networks, May 2000; pp. 11-1 to 11-28.

"JUNOS™ Internet Software Configuration Guide Interfaces and Chassis Release 4.1"; Juniper Networks, Inc.; Jul. 27, 2000; pp. Front cover to 388.

"SilkWorm 3800 Specification"; Brocade Communications Systems, Inc.; Aug. 2001; pp. Front cover to 39.

\* cited by examiner

| SID | DID | First Network Priority | Second Network Priority |
|---|---|---|---|
| $S_1$ | $D_1$ | $P_4$ | $VLAN_M$ |
| $S_2$ | $D_2$ | $P_5$ | $VLAN_H$ |
| $S_1$ | $D_5$ | $P_4$ | $VLAN_M$ |
| $S_2$ | $D_6$ | $P_6$ | $VLAN_H$ |
| $S_3$ | $D_4$ | $P_4$ | $VLAN_M$ |
| $S_1$ | $D_1$ | $P_2$ | $VLAN_L$ |
| $S_3$ | $D_6$ | $P_5$ | $VLAN_H$ |
| $S_1$ | $D_6$ | $P_2$ | $VLAN_L$ |

QUALITY OF SERVICE IN A HETEROGENEOUS NETWORK

CROSS-REFERENCE TO RELATED APPLICATIONS

The present application claims benefit of priority to U.S. Provisional Patent Application No. 61/440,317, entitled "Quality of Service in a Heterogeneous Network" and filed on Feb. 7, 2011, specifically incorporated herein by reference for all that it discloses and teaches.

BACKGROUND

In networking terms, quality of service (QoS) refers to a capability of providing different priorities to different applications, users, or data flows or to guarantee a certain level of performance to a data flow. For example, a communications network may have different types of data traffic that have different performance requirements, such as video streaming traffic and data backup traffic. To provide an acceptable video playback experience, the video streaming traffic may require a high level of throughput (e.g., to avoid delays in the playback) and can therefore benefit from a high priority level. In contrast, the data backup traffic can tolerate some measure of lower performance and can therefore be assigned a lower priority where network resources are constrained. In this manner, the video streaming traffic can have greater access to the limited network resources than the data backup traffic so as to maintain the required high level of throughput.

However, Fibre Channel over Ethernet (FCoE) represents a multiprotocol communications standard that allows Fibre Channel (FC) traffic to use an Ethernet network while preserving the FC protocol. This multiprotocol nature of FCoE presents incompatibilities for providing QoS within an FCoE nature. For example, a FC implementation may support a protocol-specific or implementation-specific predetermined number of QoS levels (e.g., eight) and further requires in-order, lossless communications, whereas Ethernet does not support the same QoS scheme and does not require in-order, lossless communications. As such, traffic behaves differently in each protocol. Accordingly, managing QoS within a multiprotocol environment offers a significant technical challenge. Likewise, it is difficult to maintain QoS across protocol boundaries (e.g., between an Ethernet network and a Fibre Channel network).

SUMMARY

Implementations described and claimed herein address the foregoing problems by providing a network device including priority map storage configured to store one or more mapping data structures for mapping multiple priorities of a first network protocol (e.g., FC) to multiple priorities of a second network protocol (e.g., Ethernet). In addition, mapping logic of the network devices is coupled to the priority map storage and configured to translate a first priority of a first frame instance of the first network protocol to a second priority of the second network protocol and to assign the second priority to a second frame instance carrying payload of the first frame instance in preparation of transmission of the second frame instance in accordance with the second network protocol.

Another implementation provides a method and a computer-readable storage medium encoding computer-executable instructions for executing on a computer system a computer process in which a first priority of a first frame instance of a first network protocol (e.g., FC) is translated to a second priority of a second network protocol (e.g., Ethernet), based on one or more mapping data structures that map multiple priorities of the first network protocol to multiple priorities of the second network protocol. The second priority is assigned to a second frame instance carrying a payload of the first frame instance in preparation of transmission of the second frame instance in accordance with the second network protocol.

In an alternative implementation, a network device includes priority map storage configured to store one or more mapping data structures for mapping multiple priorities of a first portion of a heterogeneous network (e.g., an FCoE network) to multiple priorities of a second portion of the heterogeneous network. In this implementation, for example, the different portions of the heterogeneous network support different priority schemes. In addition, mapping logic of the network devices is coupled to the priority map storage and configured to translate a first priority of a first frame instance received from the first portion of the heterogeneous network to a second priority supported by the second portion of the heterogeneous network and to assign the second priority corresponding with a designated egress port to a second frame instance associated with the first frame instance in preparation of transmission of the second frame instance from the egress port into the second portion of the heterogeneous network.

Another implementation provides a method and a computer-readable storage medium encoding computer-executable instructions for executing on a computer system a computer process in which a first priority of a first frame instance of a first portion of a heterogeneous network (e.g., an FCoE network) is translated to a second priority of a second portion of the heterogeneous network, based on one or more mapping data structures that map multiple priorities of the first network portion to multiple priorities of the second network portion. In this implementation, for example, the different portions of the heterogeneous network support different priority schemes. A second priority corresponding with a designated egress port is assigned to a second frame instance associated with the first frame instance in preparation of transmission of the second frame instance from the egress port into the second network portion.

Other implementations are also described and recited herein.

DETAILED DESCRIPTIONS

Figure 1:
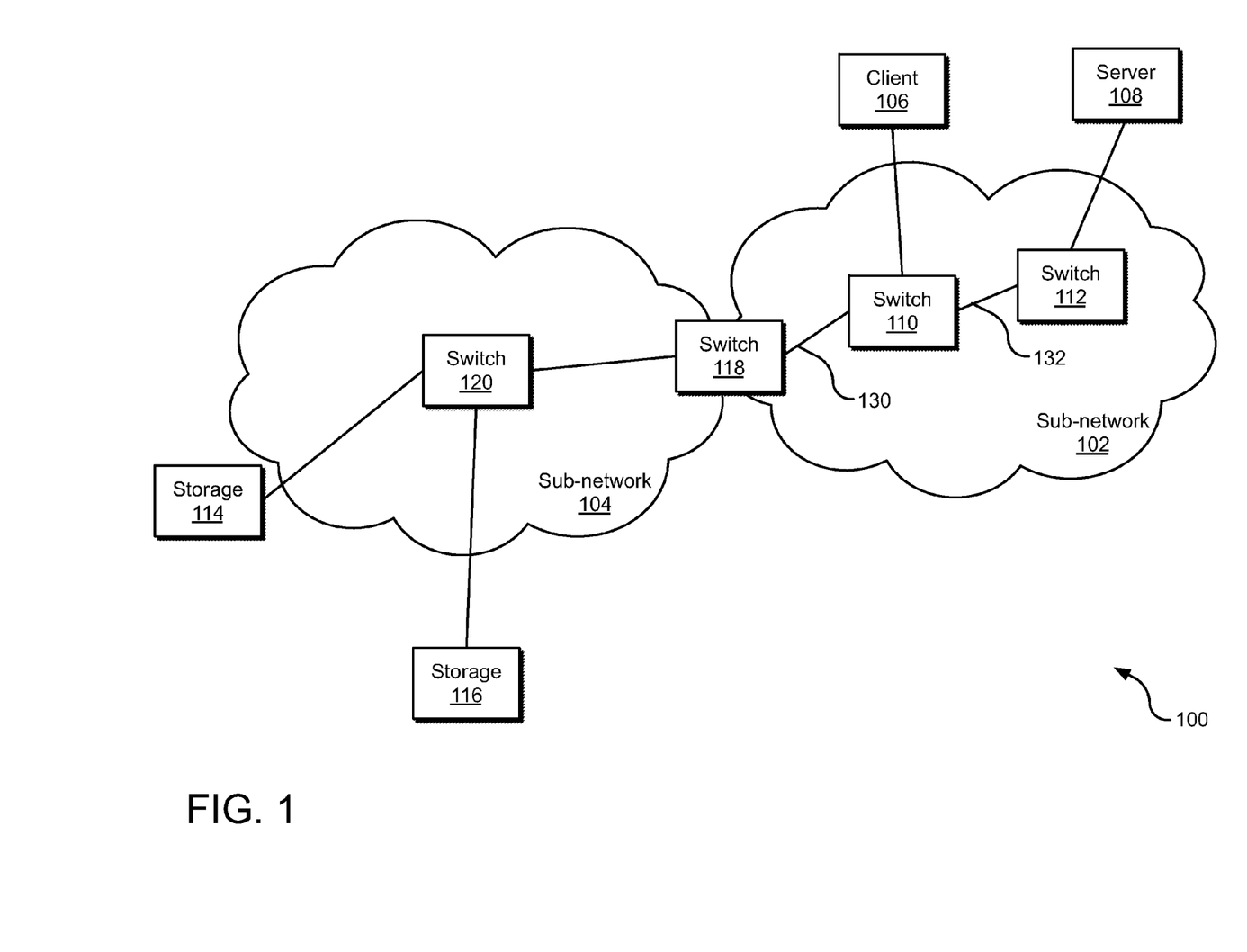
FIG. 1 illustrates example heterogeneous network providing quality of service (QoS) support across the heterogeneous network.

FIG. 1 illustrates example heterogeneous network 100 providing quality of service (QoS) support across two portions of the heterogeneous network 100. In one implementation, the network 100 supports multiple network protocols and, in the illustrated example, includes a first sub-network 102 and a second sub-network 104. In one example implementation, the first sub-network 102 is an Ethernet network and the second sub-network 104 is a Fibre Channel (FC) fabric. In another implementation, the first sub-network 102 and the second sub-network 104 comply with the same network protocol (e.g., both are parts of the same Ethernet network) but support different priority schemes. It should be understood that a network may include other types of sub-networks, network protocols, and priority schemes. The sub-networks and the network protocols of the heterogeneous network 100 support priorities (e.g., QoS) in different ways, such that a priority designation in one sub-network or protocol scheme is not supported (e.g., at all or in the same way) in another sub-network or protocol scheme.

To provide a more concrete example, assume that the first sub-network 102 is an Ethernet network that supports Fibre Channel over Ethernet (FCoE). In one implementation, FCoE refers to technology complying with a standard specification for communicating storage traffic (e.g., FC traffic) over a data network (e.g., an Ethernet network). For example, one implementation of FCoE encapsulates a FC frame within an Ethernet packet to allow the FC frame to travel through the Ethernet network. When the FCoE packet is to be forwarded into an FC fabric, the FC frame is de-encapsulated and transmitted into the FC fabric in its native form.

In the example of the network 100, the Ethernet network 102 operates primarily as a local area network (LAN), allowing a client computer 106 to access an application server 108 through the switches 110 and 112 in the Ethernet network 102. In one scenario, the client computer 106 may access the server 108 to access an email application, such as MICROSOFT EXCHANGE. Other configurations and applications may also be employed across the Ethernet network 102.

In contrast, the client 106 and server 108 may also access storage through the second sub-network 104, which is an FC fabric in this example. For example, the client 106 may access storage 114 to stream back video for display on the client 106, and the server 108 may access storage 116 for backup purposes. It should be understood that storage may be embodied by a large assortment of storage systems including external magnetic drives, RAID (Redundant Array of Inexpensive Disks) systems, tape systems, etc., and any combination thereof. Other configurations and applications may also be employed across the FC fabric 104.

In FIG. 1, a switch 118 operates as a bridge between the first sub-network 102 and the second sub-network 104. The switch 118 supports both the second sub-network protocol (via its ports connected to the second sub-network 104) and the first sub-network protocol (via its ports connected to the first sub-network 102). Furthermore, the switch 118 operates to encapsulate frames traveling through it from the second sub-network 104 to the first sub-network 102 and to de-encapsulate frames traveling through it from the first sub-network 102 to the second sub-network 104, and vice-versa.

A separate switch 120 is also illustrated within the second sub-network 104, connecting the storage elements 114 and 116 to the switch 118. It should be understood that both the second sub-network 104 and the first sub-network 102 may be both internally connected by additional switches and externally connected to other networks, sub-networks, and/or devices.

In another implementation, the switch 110 also resides in a heterogeneous network (e.g., an FCoE network). Although the switch 110 handles traffic within the same network protocol at each port (e.g., within an Ethernet protocol), the switch 110 communicates multiprotocol traffic (e.g., FCoE traffic) and manages different priority schemes at different ports. For example, the port connected to a link 130 may support a different priority scheme than the port connected to a link 132. Nevertheless, the switch 110 manages the priorities of traffic flowing through its ports to maintain these priorities (or substantially consistent proxies thereof) from one port to another.

In the case of video streaming, the video data traffic should be a high priority so as to effect a consistently high data rate and thereby ensure a smooth video playback (e.g., without delays or skips). In contrast, the backup application is much less dependent upon a consistently high data rate and can accommodate less consistent performance. Accordingly, it would be reasonable to designate the video data traffic with a higher priority than the backup data traffic so that the video remains smooth if and when network resources approach congestion. However, the differences between how the second sub-network 104 handles QoS and how the first sub-network 102 handles QoS would traditionally not allow the QoS to be robustly supported end-to-end across the network 100. Likewise, differences between the protocol schemes supported on links 130 and 132 (and their associated ports) also introduce technical challenges.

For example, in one implementation, the frames within the second sub-network 104 support 8 QoS levels identified by a field in the headers of the frames (e.g., a field representing virtual channel priority or traffic class, etc. in a FC fabric). In contrast, the frames traversing the first sub-network 102 may be communicating through various virtual LANs (VLANs), wherein each VLAN is designated with a specific priority field. Accordingly, the 8 priority or QoS levels of the second sub-network 104 may not correspond directly with the priority scheme implemented using the specific priority of the first sub-network 102. As such, the switch 118 coordinates the QoS implementation in each of the specific sub-networks to preserve designated QoS levels for individual frames through both network protocols. Accordingly, the described technology can support different priority schemes supported by different network protocols of a heterogeneous network.

Furthermore, individual links within a sub-network (e.g., an Ethernet sub-network) may have different priority schemes as compared to other links in the network, particularly when communicating multiprotocol traffic (e.g., FCoE traffic). As such, even a network-internal switch, such as the switch 110 may be coordinating different QoS implementations between a link connected to one of its ingress ports and another link connected to one of its egress ports. Accordingly, the described technology can support port-specific priority schemes within a single network protocol of a heterogeneous network.

Figure 2:
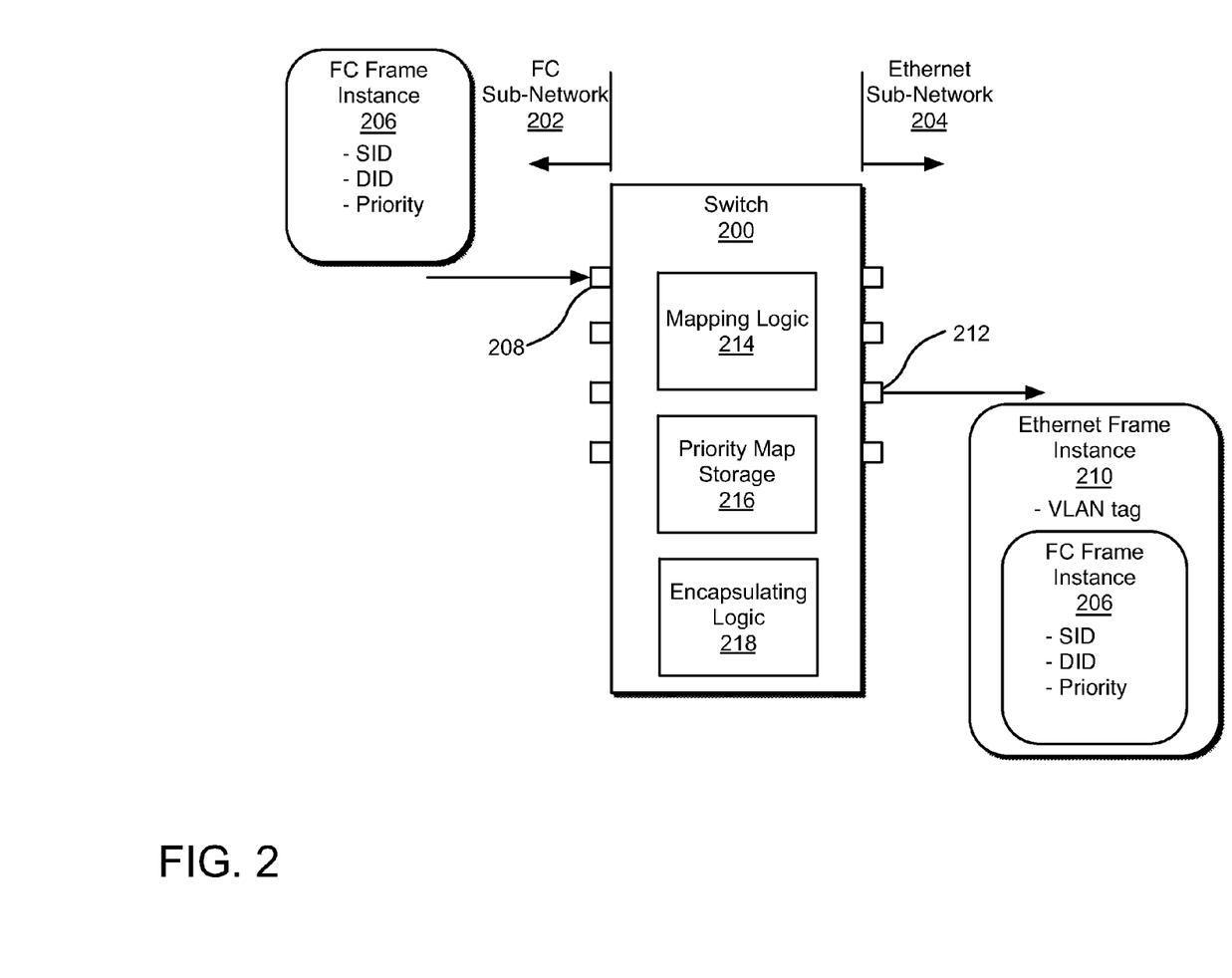
FIG. 2 illustrates an example networking device managing QoS between two different network protocols in a heterogeneous network.

FIG. 2 illustrates an example networking device (e.g., the switch 200) managing QoS between two different network protocols (e.g., a FC sub-network 202 and an Ethernet sub-network 204) in a heterogeneous network. This description focuses on a FC frame instance 206 that is received from the FC sub-network 202 by the switch 200 at an ingress port 208, encapsulated in an Ethernet frame instance 210, and transmitted by the switch 200 from an egress port 212 into the Ethernet sub-network 204, although it should be understood that the described technology applies in the reverse direction and may or may not involve encapsulation or de-encapsulation. Indeed, in some implementations, translation of a frame instance from one native protocol format to another, rather than encapsulation/de-encapsulation may be employed.

As discussed, the switch 200 supports multiple protocols, each having a different mechanism for designating and managing QoS. The described technology provides mapping to allow the switch 200 to maintain consistent aspects of the priority between these two differently equipped network protocols.

As shown in FIG. 2, the FC frame instance 206 includes flow information (e.g., source identifier (SID) and destination identifier (DID)) and a priority. In one implementation, the priority of the FC frame instance 206 within the FC protocol is designated by a field representing virtual channel priority or traffic class or a similar field within the content of the frame instance (e.g., the FC frame header). For purposes of this description, all data within the FC frame instance, including the header and payload, is considered content of the frame instance in which the priority information may be recorded.

In contrast, the Ethernet frame instance 210 encapsulates the FC frame instance 206 as its payload. Accordingly, when the encapsulating Ethernet frame instance 210 traverses the Ethernet network 204, the flow and priority information of the FC frame instance 206 is also encapsulated within the Ethernet frame instance's payload and therefore isolated from the Ethernet protocol. Accordingly, the switch 200 determines and executes a translation between the FC protocol priority and the Fibre Channel over Ethernet (FCOE) protocol priority and then assigns the Ethernet protocol priority to the Ethernet frame instance 210. In one implementation, the priority assignment involves priority field of a virtual LAN (VLAN) tag in the content of the Ethernet frame instance 210 (e.g., the Ethernet frame header). For purposes of this description, all data within the Ethernet frame instance 210, including the header and payload, is considered content of the frame instance in which the priority information may be recorded.

Figure 3:
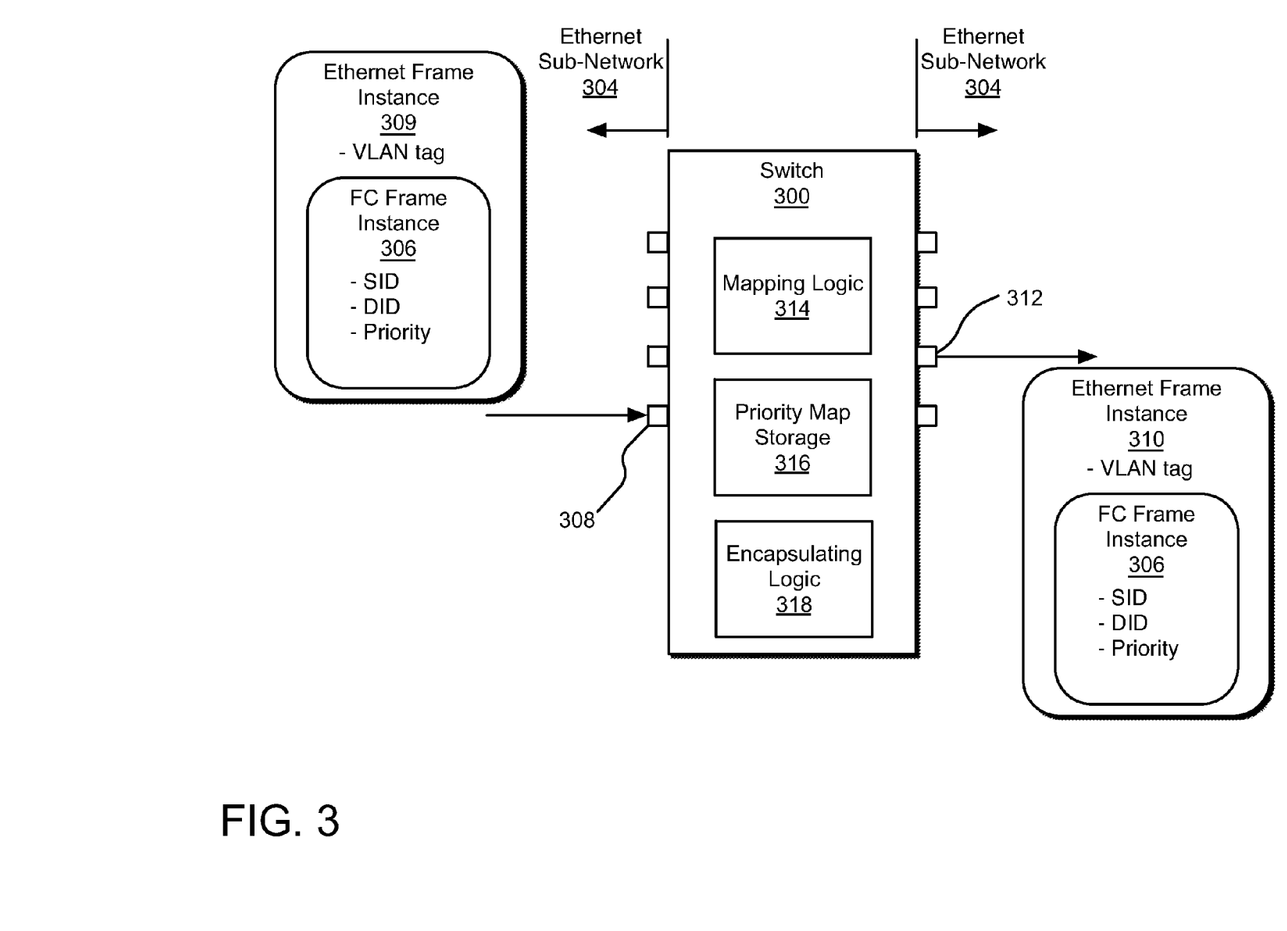
FIG. 3 illustrates an example networking device managing QoS between two portions of an Ethernet network.

The switch 200 determines such a priority translation using mapping logic 214 and mapping data structures within priority map storage 216. FIG. 3 provides an example of priority mapping tables useful for this purpose. As an example, referring to the traffic flow illustrated in FIG. 2, the mapping logic 214 examines the SID, DID, and priority information of the FC frame instance 206, refers to the priority mapping tables in the priority map storage 216, and determines a translated priority. The switch 200 then encapsulates (via encapsulating logic 218) the FC frame instance 206 in the Ethernet frame instance 210 and tags the Ethernet frame instance 210 with a VLAN tag assigning the translated priority. The encapsulation logic 218 can also effect de-encapsulation for traffic in the reverse direction in FIG. 2.

FIG. 3 illustrates an example networking device (e.g., the switch 300) managing QoS between two portions of an Ethernet sub-network 304 with different priority schemes. This description focuses on a FC frame instance 306 encapsulated in a first Ethernet frame instance 309 that is received by the switch 300 at an ingress port 308 from a first portion of the Ethernet network 304 and transmitted by the switch 300 as a second Ethernet Frame instance 310 from an egress port 312 to a second portion of the Ethernet network 304. It should be understood that the described technology applies in the reverse direction and may or may not involve encapsulation or de-encapsulation. Indeed, in some implementations, translation of a frame instance from one native protocol format to another, rather than encapsulation/de-encapsulation may be employed. Furthermore, the first and second Ethernet frame instances 309 and 310 represent the same Ethernet frame but in different states (e.g., on different sides of the switch 300 or different stages of processing).

As discussed, the switch 300 supports the same networking protocol but also supports different mechanisms for designating and managing QoS. The described technology provides mapping to allow the switch 300 to maintain consistent aspects of the priority between two priority schemes within the same networking protocol.

As shown in FIG. 3, the FC frame 306 includes flow information (e.g., source identifier (SID) and destination identifier (DID)) and a priority. In one implementation, the priority of the FC frame instance 306 within the FC protocol is designated by a field representing virtual channel priority or traffic class, or a similar field within the content of the frame (e.g., the FC frame header). For purposes of this description, all data within the FC frame 306, including the header and payload, is considered content of the frame in which the priority information may be recorded. Upon entering the Ethernet sub-network 304, the FC frame instance 306 was encapsulated in an Ethernet frame instance 309 to which a priority was assigned (e.g., as designated by a priority field in the VLAN tag of the Ethernet frame instance 309). In some implementations, a VLAN tag includes a control information field, which includes a VLAN ID and a priority field, which is termed a "priority code point."

Figure 5:
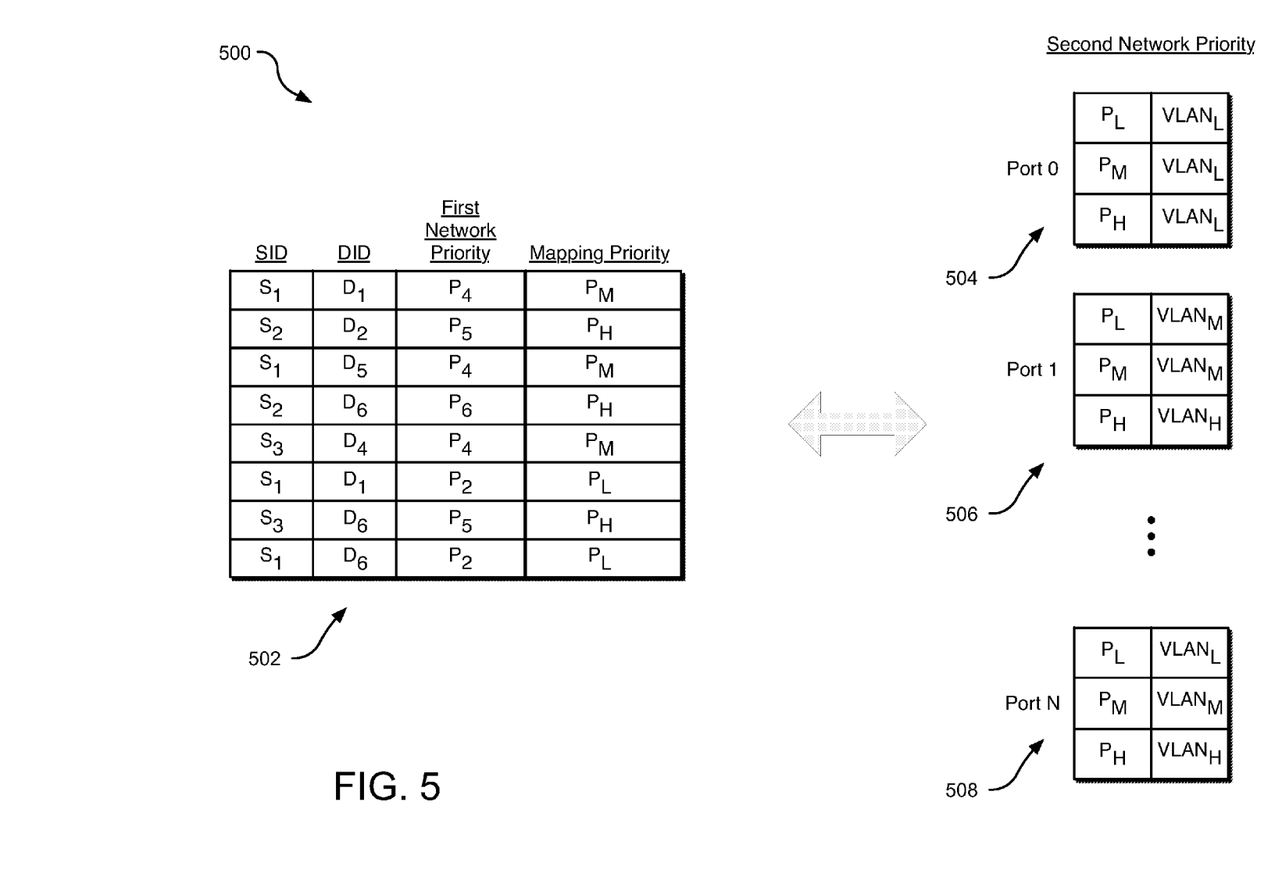
FIG. 5 illustrates alternative example mapping tables useful for translating QoS levels between two different priority schemes in a heterogeneous network.

Upon receipt of the Ethernet frame instance 309 by the switch 300, the priority of the Ethernet frame instance 309 is mapped to a priority associated with the egress port 312 of the switch 300 to which the Ethernet frame instance 309 is forwarded. However, the priority scheme in the first portion of the Ethernet sub-network 304 differs from the priority scheme in the second portion of the Ethernet sub-network 304. Therefore, the switch 300 maps the ingress priority to an egress-port-specific priority for traffic in each flow (e.g., as designated by the SID-DID of the FC frame instance 306). The SID-DID of the FC frame instance 306 and the priority field in the VLAN tag of the Ethernet frame instance 309 are used to map to an intermediate priority (e.g., a mapping priority), which is then mapped to an egress-port-specific priority for transmission of the Ethernet frame instance 310 into the second portion of the Ethernet sub-network 304. FIG. 5 provides an example of priority mapping tables useful for this purpose.

As an example, referring to the traffic flow illustrated in FIG. 3, the mapping logic 314 examines the SID and DID of the FC frame instance 306 and the VLAN tag of the Ethernet frame instance 309, refers to the priority mapping tables in the priority map storage 316, and determines a translated priority. In the illustrated example, the translated priority is dependent upon the egress port to which the frame instance is forwarded for transmission into the second portion of the Ethernet sub-network 304.

Figure 4:
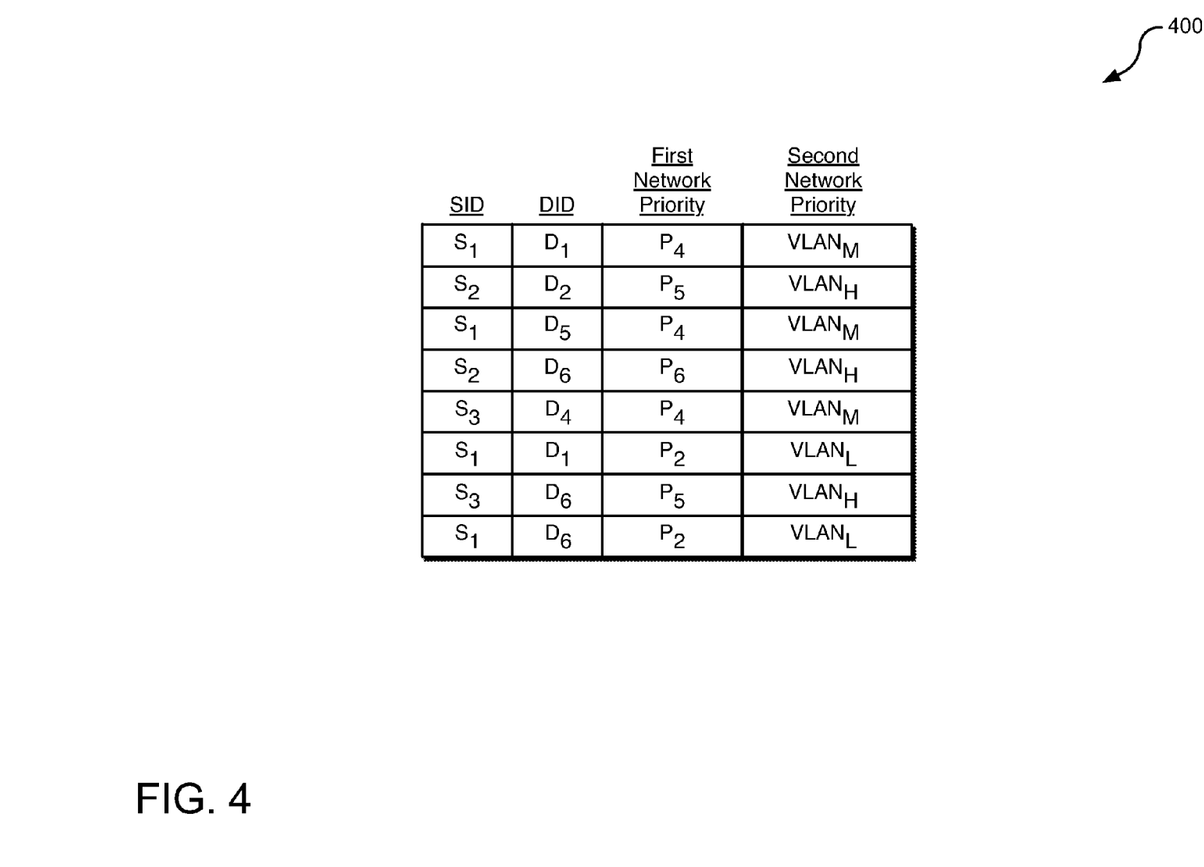
FIG. 4 illustrates an example mapping table useful for translating QoS levels between two different priority schemes in a heterogeneous network.

FIG. 4 illustrates an example mapping table 400 useful for translating QoS levels between two different priority schemes in a heterogeneous network. For example, the example mapping table 400 includes flow information pertaining to an FC frame instance (e.g., SID and DID) and an FC-based priority designation (e.g., first network priority). A priority translating switch between the two different protocols extracts the flow information and first network priority from the frame instance of the first protocol and looks them up in the example mapping table 400 to determine a translated priority for transmission of the traffic into the second network protocol. For example, the translated priority is added to the encapsulating Ethernet frame instance that carries the FC frame instance as its payload upon transmission. It should be understood that a similar technique may be employed in certain implementations when translating priorities between different sub-networks of a heterogeneous network having the same network protocol but different priority schemes.

FIG. 5 illustrates alternative example mapping tables 500 useful for translating QoS levels between two different priority schemes in a heterogeneous network. For example, a mapping table 502 includes flow information pertaining to an FC frame instance (e.g., SID and DID) and an FC-based priority designation (e.g., first network priority). Such look up records are associatively stored with an intermediate or "mapping" priority. A priority translating switch between the two priority schemes in a heterogeneous network extracts the flow information and first network priority from the received frame instance of the first priority scheme and looks them up in the mapping table 502 to determine a mapping priority corresponding to that flow and that first network priority. The priority translating switch also determines the egress port from which the frame instance is to be transmitted.

Using this identified egress port and the mapping priority, the priority translating switch determines the egress-port-specific priority associated with the flow using egress-port-specific priority tables 504, 506, and 508. This egress-port-specific priority is attributed to a second frame instance for transmission of the traffic according to the second priority scheme. For example, the determined egress-port-specific priority is added to the encapsulating Ethernet frame instance that carries the FC frame instance as its payload upon transmission. It should be understood that a similar technique may be employed in certain implementations when translating priorities between different network protocols of a heterogeneous network having different network protocols and different priority schemes.

It should be understood that alternative mapping methods may be employed. For example, the first priority may be directly mapped to the mapping priority without regard to the SID or DID.

Figure 6:
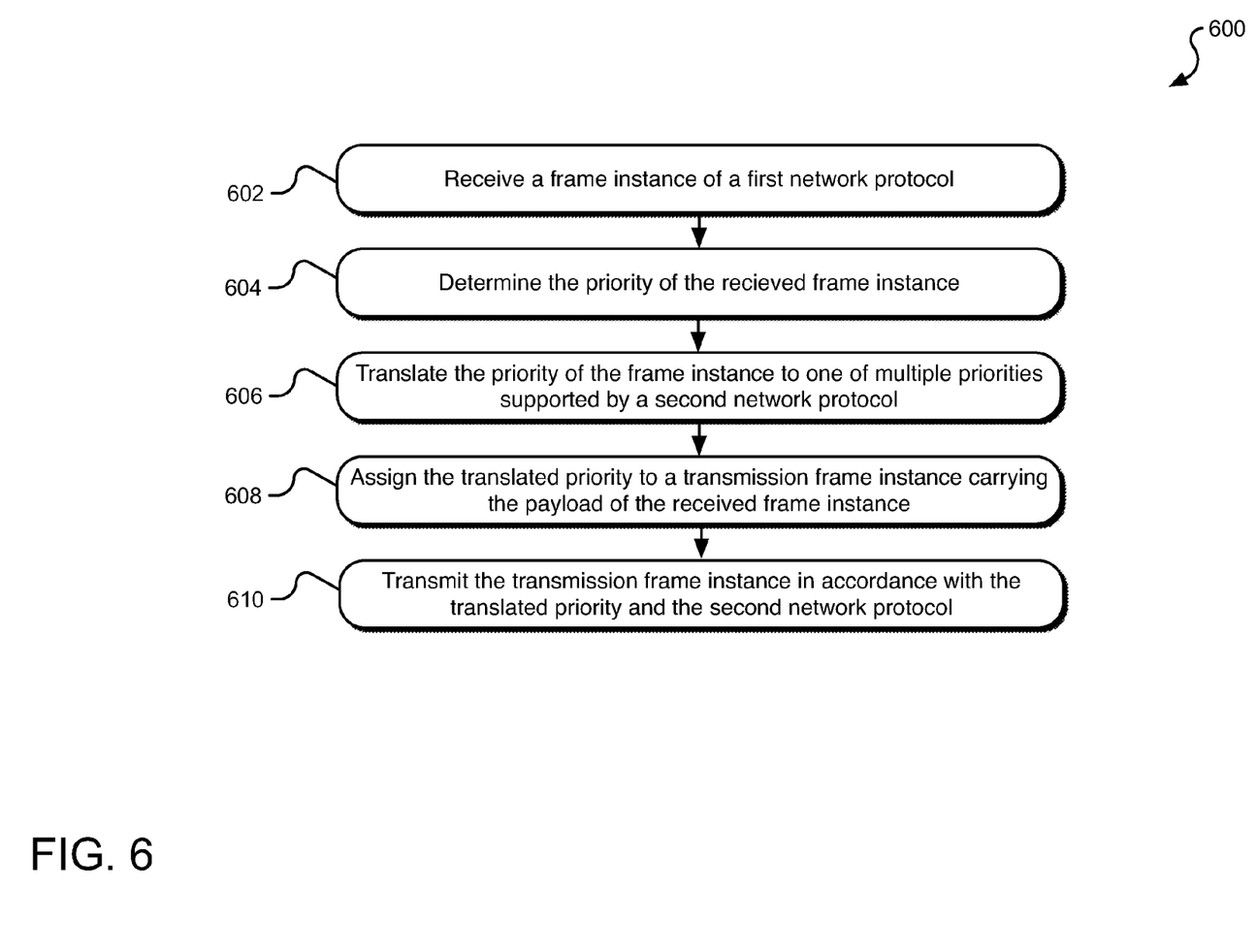
FIG. 6 illustrates example operations for providing QoS between two different networking protocols.

FIG. 6 illustrates example operations 600 for providing QoS between two different networking protocols. The example operations 600 may be implemented in circuitry, in software executed by processor circuitry, or a combination of both.

A receiving operation 602 receives a frame instance of a first network protocol in a heterogeneous network. Although the FC protocol and the Ethernet protocols have been described herein, other communication protocols may also be employed. A determining operation 604 determines the priority of the received frame instance, wherein the priority is supported by the first network protocol. In one implementation, the determining operation 604 determines the priority based on a field representing virtual channel priority, a priority field of a virtual LAN tag, a traffic class field, or another field in the received frame instance. However, other information may be used to determine the priority of the received frame instance, whether instead of or in addition to the fields listed above, including, for example, the port on which the frame is received, the SID, the DID, a link identifier, etc.

A translation operation 606 translates the priority of the received frame instance to one of multiple priorities supported by a second network protocol. In one implementation, the translation operation 606 consults priority map storage including one more mapping data structures that map the priorities of the first network protocol to the priorities of the second network protocol based on flow information of the received frame instance. The priorities of the first network protocol are different than the priorities of the second protocol. In one implementation, multiple priorities of the first network protocol map to a single priority of the second network protocol.

An assignment operation 608 assigns the priority of the second network protocol (i.e., the translated priority) to a second frame instance (i.e., the transmission frame instance) that carries the payload of the received frame instance. In one implementation, the assignment operation 608 writes the translated priority into the header or some other content of the second frame to designate the priority of the second frame instance.

A transmitting operation 610 transmits the second frame instance from an egress port in accordance with the translated priority and the second network protocol. In various implementations, an encapsulation or de-encapsulation operation (not shown) may be executed prior to the transmission operation 610.

Figure 7:
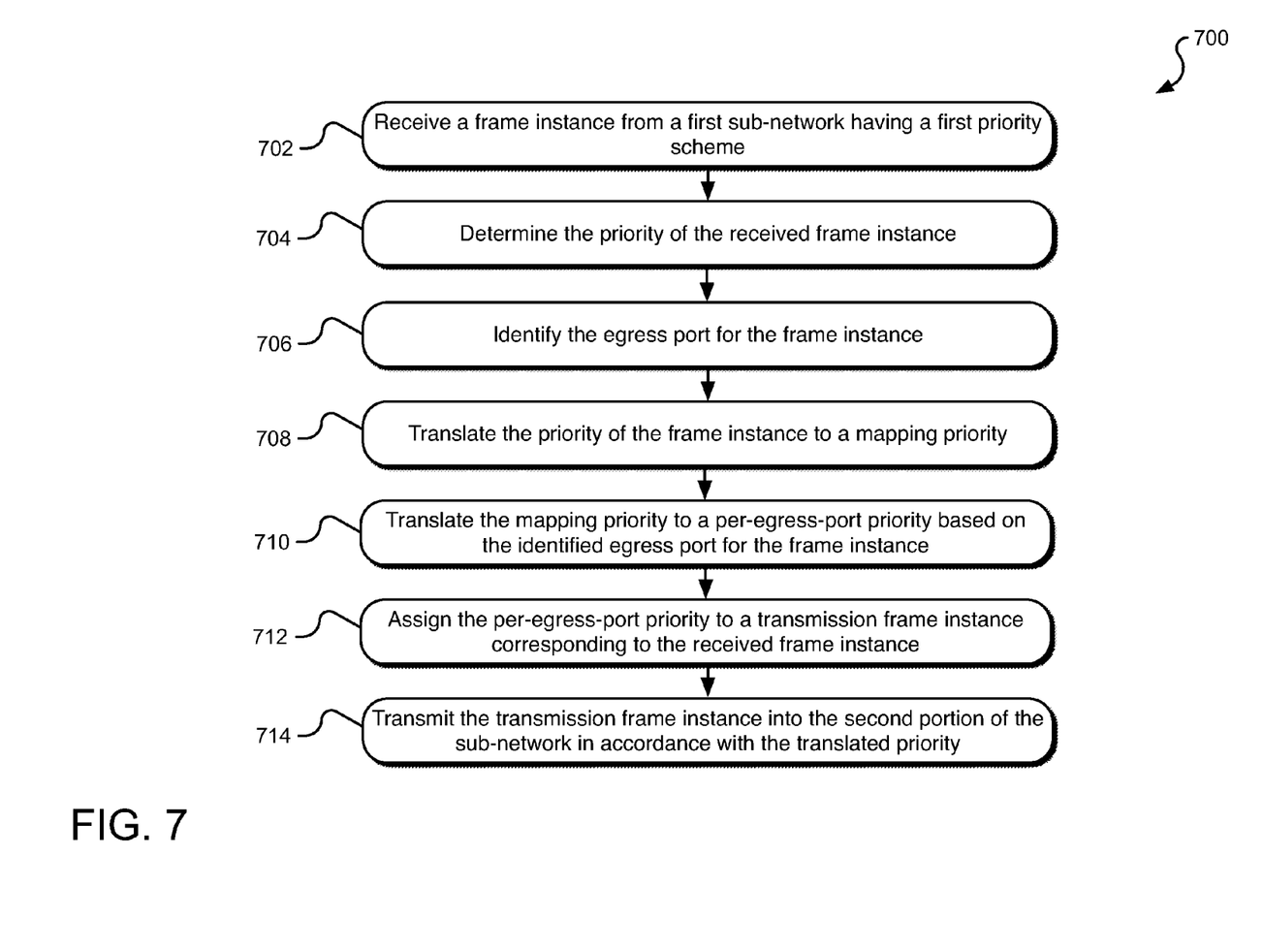
FIG. 7 illustrates example operations for providing QoS between two different priority schemes within a heterogeneous network.

FIG. 7 illustrates example operations for providing QoS between two different priority schemes within a heterogeneous network. The example operations 700 may be implemented in circuitry, in software executed by processor circuitry, or a combination of both. The priority schemes of the different portions of a sub-network within the heterogeneous network differ from each other.

A receiving operation 702 receives a frame instance from one portion of a sub-network of the heterogeneous network, wherein the first portion of the sub-network supports a first priority scheme. A determining operation 704 determines the priority of the received frame instance (e.g., based on flow information and a first priority designated within the received frame instance). In one implementation, the determining operation 704 determines the priority based on a virtual channel field, a virtual LAN field, a traffic class field, or another field in the received frame instance. However, other information may be used to determine the priority of the received frame instance, whether instead of or in addition to the fields listed above, including, for example, the port on which the frame is received, the SID, the DID, a link identifier, etc.

An identification operation 706 identifies the egress port for the frame instance. In example implementations, the egress port can be identified based on flow information and/or destination information of the received frame instance and/or forwarding tables maintained by the switch. A translation operation 708 translates the priority of the received frame instance to one of mapping priorities based on the flow information and priority of the received frame instance. In one implementation, the translation operation 708 consults priority map storage including one more mapping data structures that map the priorities and flows of first sub-network to mapping priorities. Another translating operation 710 used the identified egress port and the mapping priority to consult a priority table associated with the egress port and to determine a corresponding egress-port-specific priority.

An assignment operation 712 assigns the egress-port-specific priority (i.e., the translated priority) to a second frame instance (i.e., the transmission frame instance). In one implementation, the assignment operation 712 writes the translated priority into the header or some other content of the second frame instance to designate the priority of the second frame instance. A transmitting operation 714 transmits the second frame instance from an egress port in accordance with the translated priority into the second portion of the heterogeneous network.

Figure 8:
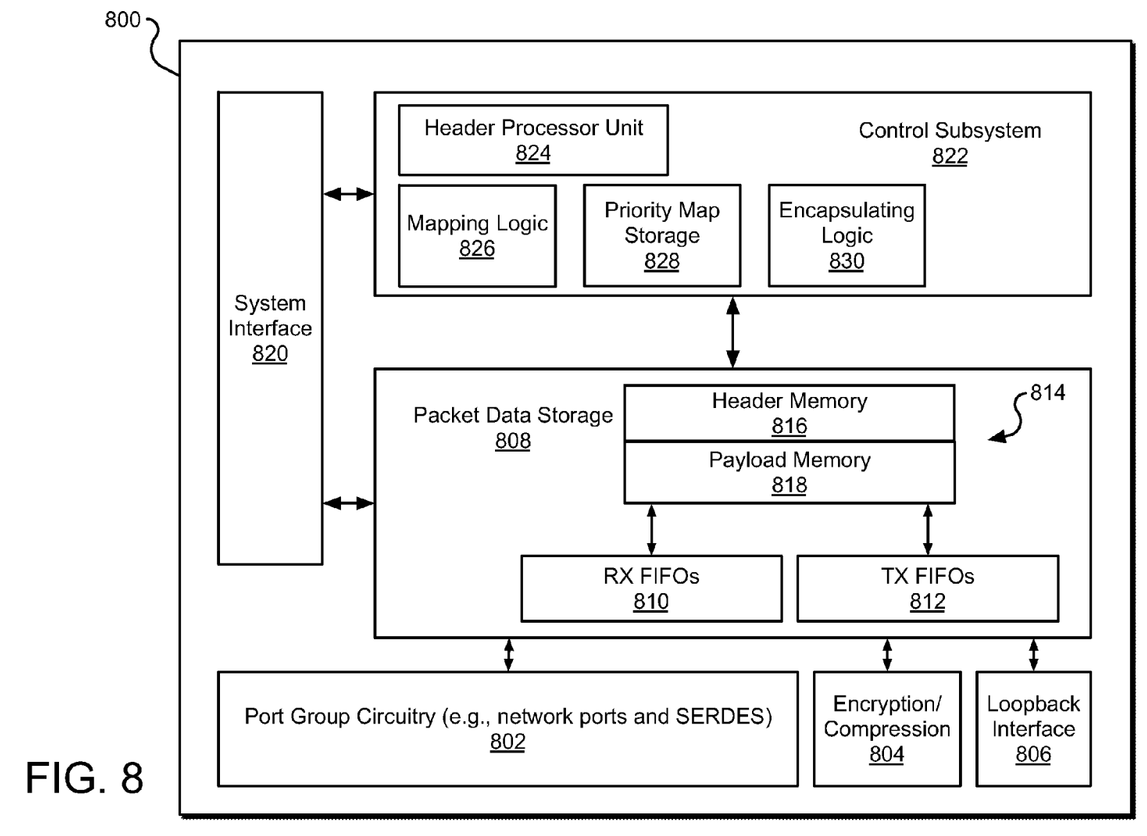
FIG. 8 illustrates an example switch architecture configured to implement QoS between two different networking protocols or between different portions of a sub-network of a heterogeneous network.

FIG. 8 illustrates an example switch architecture 800 configured to implement QoS between two different networking protocols in a heterogeneous network or between different portions of a sub-network of a heterogeneous network. In the illustrated architecture, the switch represents a Fibre Channel switch, but it should be understood that other types of switches, including Ethernet switches, may be employed. Port group circuitry 802 includes the Fibre Channel ports and Serializers/Deserializers (SERDES) for the network interface. Data packets are received and transmitted through the port group circuitry 802 during operation. Encryption/compression circuitry 804 contains logic to carry out encryption/compression or decompression/decryption operations on received and transmitted packets. The encryption/compression circuitry 804 is connected to 6 internal ports and can support up to a maximum of 65 Gbps bandwidth for compression/decompression and 32 Gbps bandwidth for encryptions/decryption, although other configurations may support larger bandwidths for both. Some implementations may omit the encryption/compression 804. A loopback interface 806 is used to support Switched Port Analyzer (SPAN) functionality by looping outgoing packets back to packet buffer memory.

Packet data storage 808 includes receive (RX) FIFOs 810 and transmit (TX) FIFOs 812 constituting assorted receive and transmit queues, one or more of which includes mirrored memories. The packet data storage 808 also includes control circuitry (not shown) and centralized packet buffer memory 814, which includes two separate physical memory interfaces: one to hold the packet header (i.e., header memory 816) and the other to hold the payload (i.e., payload memory 818). A system interface 820 provides a processor within the switch with a programming and internal communications interface. The system interface 820 includes without limitation a PCI Express Core, a DMA engine to deliver packets, a packet generator to support multicast/hello/network latency features, a DMA engine to upload statistics to the processor, and top-level register interface block.

A control subsystem 822 includes without limitation a header processing unit 824 that contains switch control path functional blocks. All arriving packet descriptors are sequenced and passed through a pipeline of the header processor unit 824 and filtering blocks until they reach their destination transmit queue. The header processor unit 824 carries out L2 switching, IP switching, Fibre Channel forwarding, general purpose ACL, Fibre Channel hard zoning, SPAN support, and encryption/decryption.

The control subsystem 822 also includes without limitation one or more mapping tables (e.g., in priority map storage 828), mapping logic 826 and encapsulating logic 830, wherein the mapping logic 826 and the encapsulating logic 830 may be embodied by circuitry, software executed by processing circuitry, or a combination of both.

A network switch may also include one or more processor-readable storage media encoding computer-executable instructions for executing one or more processes of dynamic latency-based rerouting on the network switch. It should also be understood that various types of switches (e.g., Fibre Channel switches, Ethernet switches, etc.) may employ a different architecture that that explicitly describe in the exemplary implementations disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A network device comprising:
   a first port for receiving frames;
   a second port for transmitting frames; and
   mapping logic coupled to priority map storage and configured to translate a first priority of a first frame of a first priority scheme to a second priority of a second priority scheme based on flow information of the first frame, wherein the flow information includes at least one of a source address and a destination address,
   wherein the first priority scheme is supported by a first network protocol and the second priority scheme is supported by a second, different network protocol and the network device maps between the first and second priority schemes of each network protocol in a heterogeneous network.

2. The network device of claim 1 further comprising:
   priority map storage configured to store one or more mapping data structures for mapping a first priority scheme to a second priority scheme, wherein the mapping logic is further configured to determine the second priority supported by the second priority scheme by consulting the one or more mapping data structures.

3. The network device of claim 1 wherein the first priority scheme is supported by a first portion of a sub-network of the heterogeneous network and the second priority scheme is supported by a second portion of a sub-network of the heterogeneous network.

4. The network device of claim 1 wherein the mapping logic is further configured to encapsulate the first frame within a second frame in preparation of transmission of the second frame.

5. The network device of claim 4 wherein the second port is configured to transmit the second frame in accordance with the second priority.

6. The network device of claim 1 wherein the first priority of the first frame is determined based on a priority designation and flow information of the first frame.

7. The network device of claim 1 wherein the first priority of the first frame is determined based on a priority designation, a source identifier, and a destination identifier of the first frame.

8. The network device of claim 1 wherein the first priority scheme supports a number of multiple priorities and the second priority scheme supports a different number of multiple priorities, the one or more mapping data structures being configured to map at least two priorities of the first priority scheme to a single priority of the second priority scheme.

9. The network device of claim 1 wherein the second priority is dependent upon the second port.

10. A method comprising:
   receiving at a first port, a first priority of a first frame corresponding to a first priority scheme;
   translating, by mapping logic connected between the first port and a second port, the first priority to a second priority of a second priority scheme based on flow information of the first frame, wherein the flow information includes at least one of a source address and a destination address; and
   transmitting from the second port using the second priority,
   wherein the first priority scheme is supported by a first network protocol, the second priority scheme is supported by a second, different network protocol, and the translating operation comprises mapping between the first and second priority schemes of each network protocol in a heterogeneous network.

11. The method of claim 10 wherein the first priority scheme is supported by a first portion of a sub-network of the heterogeneous network and the second priority scheme is supported by a second portion of a sub-network of the heterogeneous network.

12. The method of claim 10 further comprising:
   encapsulating the first frame within a second frame in preparation of transmission of the second frame.

13. The method of claim 10 wherein the first priority of the first frame is determined based on a priority designation and flow information of the first frame.

14. The method of claim 10 wherein the first priority of the first frame is determined based on a priority designation, a source identifier, and a destination identifier of the first frame.

15. The method of claim 10 wherein the second priority is dependent upon the second port.

16. One or more non-transitory computer-readable storage media encoding computer-executable instructions for executing on a computer system a computer process comprising:
   translating a first priority of a first frame received at a first port of a first priority scheme to a second priority of a second priority scheme for transmission from a second port based on flow information of the first frame, wherein the flow information includes at least one of a source address and a destination address,
   wherein the first priority scheme is supported by a first network protocol, the second priority scheme is supported by a second, different network protocol, and the translating operation comprises mapping between the first and second priority schemes of each network protocol in a heterogeneous network.

17. The one or more non-transitory computer-readable storage media of claim 16 wherein the first priority scheme is supported by a first portion of a sub-network of the heterogeneous network and the second priority scheme is supported by a second portion of a sub-network of the heterogeneous network.

* * * * *